W. S. WOOD.
Polishing-Machines.
No. 157,261. Patented Nov. 24, 1874.
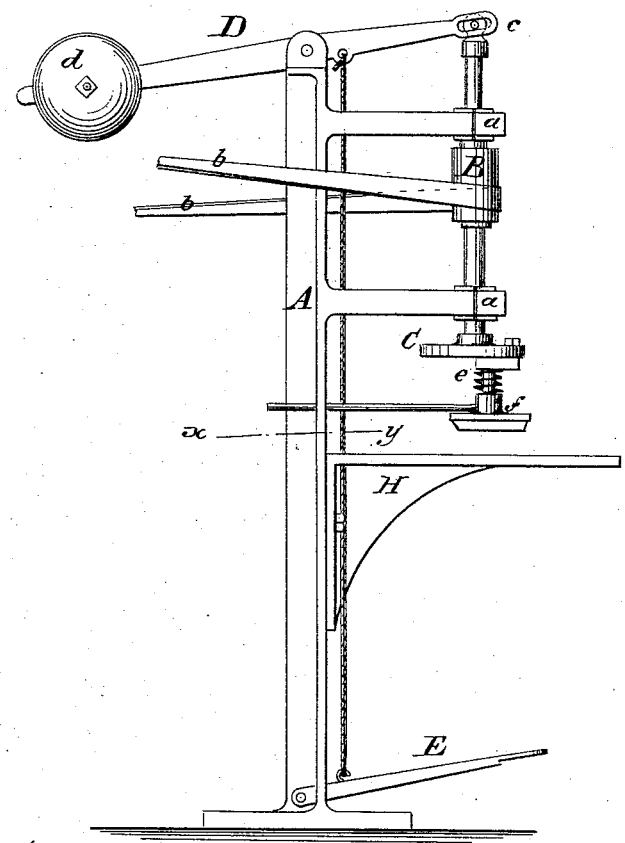
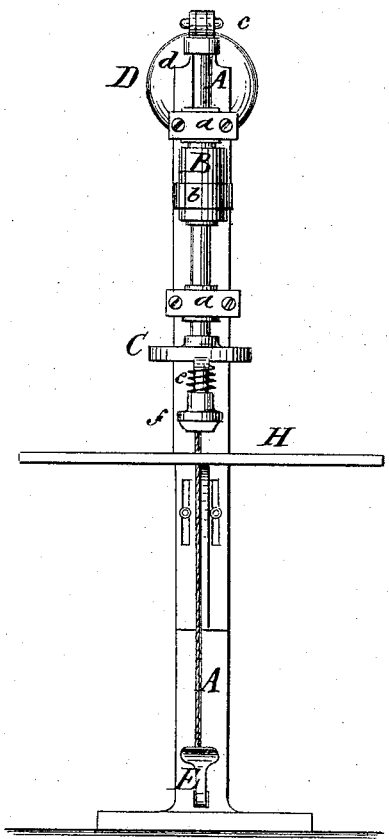
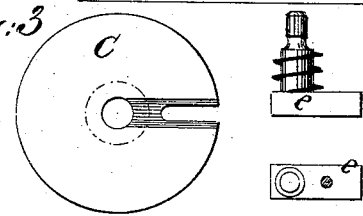
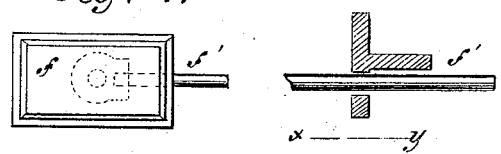
WITNESSES:
Chas. Nida
Alex F. Roberts
INVENTOR:
W. S. Wood
BY
Munn
ATTORNEYS.

UNITED STATES PATENT OFFICE.

WILLIAM S. WOOD, OF NEWTOWN, NEW YORK.

IMPROVEMENT IN POLISHING-MACHINES.

Specification forming part of Letters Patent No. 157,261, dated November 24, 1874; application filed August 29, 1874.

*To all whom it may concern:*

Be it known that I, WM. S. WOOD, of Newtown, in the county of Queens and State of New York, have invented a new and Improved Rubbing-Machine, of which the following is a specification:

My invention relates to a machine designed for rubbing down rough surfaces, so as to make them smooth or polished by means of a compound circular and lateral motion, (closely imitating that of the hand in the so-called French polishing process,) imparted to the substance employed in cutting or rubbing the surface acted upon, such as marble, wood, metal, painted or enameled surfaces, &c., said motion being effected by a rotary spindle with a chuck-plate, to which is attached a spring-pivot carrying a box or holder for the grinding substance in such a manner that the pressure and stroke or motion are entirely at the command of the operator.

The object of my invention is to produce a smooth or polished surface with great speed and accuracy, and with less manual labor than is now employed.

Figure 1 is a side elevation of a machine embodying my invention. Fig. 2 is a front elevation of the same. Fig. 3 is the chuck-plate and spring-pivot. Fig. 4 shows a bottom view of the holder and a section of the frame of the machine where the steering-rod passes through it.

Similar letters of reference indicate corresponding parts.

A is an upright frame, which should be substantially made to resist the vibrations of the operating parts. $a$ $a$ are the journals. B is a rotary spindle with driving-pulley, driven by the belt $b$, from which motion is communicated to the operating parts. C is a chuck-plate on the spindle B, to which is attached a spring-pivot, $e$, carrying the holder $f$, by means of a pin sliding in the circular groove of spring-pivot $e$. $f'$ is the steer-rod attached to the holder $f$, passing through a slotted space in the upright frame A, as shown in section $x$ $y$, Fig. 4, thus giving to the holder $f$ the lateral while the revolving chuck-plate C gives to it the circular motion. D is a lever with an adjustable counter-weight, $d$, at one end, the other end carrying a jointed socket, $c$, from which the spindle B is suspended, although allowed to revolve freely. E is a treadle, connected with the lever D, as shown in Fig. 1, by means of which the holder $f$ is brought down to touch the surface operated upon, the spring-pivot $e$ allowing it to yield slightly upward to pressure to adapt it to any little variations of the surface. H is an adjustable table, upon which the work is placed, held to the upright frame A by means of bolts or other contrivance, as represented in Fig. 2.

I make no claim to the mode in which the spindle B is suspended, elevated, or depressed, as I am aware that it is not new; but

What I claim as new, and desire to secure by Letters Patent, is—

The combination, in a rubbing and polishing machine, of the pivoted holder $f$, slotted revolving disk or plate C, and steering-rod $f'$, as shown and described, for the purpose specified.

WILLIAM S. WOOD.

Witnesses:
T. B. MOSHER,
ALEX. F. ROBERTS.